United States Patent [19]

Gajjar

[11] 4,294,404

[45] Oct. 13, 1981

[54] ENVIRONMENTAL CONTROL SYSTEM

[75] Inventor: Jagdishchandra T. Gajjar, Clifton Park, N.Y.

[73] Assignee: Integrated Energy Systems, Schenectady, N.Y.

[21] Appl. No.: 877,682

[22] Filed: Feb. 14, 1978

[51] Int. Cl.³ ............................................. F24F 7/00
[52] U.S. Cl. ...................................... 236/49; 236/94; 165/11 A
[58] Field of Search .................. 236/49, 47, 94, 44 C, 236/1 R; 165/11; 62/126; 235/92 CT

[56] References Cited

U.S. PATENT DOCUMENTS

| | | | |
|---|---|---|---|
| 3,011,718 | 12/1961 | Joerren et al. | 165/11 |
| 3,181,791 | 5/1965 | Axelrod | 236/44 C |
| 3,352,490 | 11/1967 | Dalzell et al. | 236/68 B |
| 4,000,400 | 12/1976 | Elder | 235/92 CT |
| 4,060,123 | 11/1977 | Hoffman et al. | 165/11 |
| 4,084,744 | 4/1978 | Wilson, Jr. | 236/49 |
| 4,114,807 | 9/1978 | Naseck | 236/1 E |

Primary Examiner—William E. Wayner
Attorney, Agent, or Firm—Paul I. Edelson

[57] ABSTRACT

An environmental control system for improving the energy efficiency of structures is disclosed. A structure having a heating and/or cooling plant, of any conventional type, is improved by providing, in each subdivision of the structure, such as a room, a temperature sensor, and an occupancy sensor. The outputs of the temperature and occupancy sensors are received by a control subsystem whose output is a composite function of the output signals of the occupancy and temperature sensors and which controls the heating and/or cooling system of the structure to maintain each room at a first temperature when the room is occupied, and at a second temperature when the room is unoccupied.

18 Claims, 9 Drawing Figures

Typical Winter Weekday Usage for a Family of Four

ENVIRONMENTAL CONTROL SYSTEM

This invention relates to systems for controlling the interior environment of structures, such as heating and cooling systems. More particularly, this invention relates to the employment of multiple sensors and control systems to so regulate the operation of environment modification apparatus to minimize undesired energy losses.

Many types of apparatus are known and used for controlling the interior environment of structures. For example, central and room heating and air conditioning apparatus are known, as well as humidifiers, dehumidifiers, and air cleaners. In the case of heating apparatus and air conditioners, the prior art almost universally provides a quasi automatic control device, in the form of a thermostat, to control the operation of the apparatus to maintain the volume served by the apparatus at a desired temperature. Many humidifiers and dehumidifiers are similarly equiped with a humidistat to provide automatic or semiautomatic maintenance of a desired humidity level in the volume served. For simplicity, only a heating system will be discussed in detail herein, but it should be understood that the characteristics of environmental control systems, and the applicability of this invention thereto is general, and is not restricted to heating systems alone.

A common characteristic of heating, and other systems for modifying an attribute of the environment within a structure is that they consume substantial quantities of energy. Particularly in recent years, energy conservation has become extremely important both in terms of the individual economic interest of a building owner, and the general interest of society in the conservation and allocation of scarce resources. In addition, energy conservation has the beneficial side effect of reducing air pollution and thermal pollution.

Obviously, conservation of any resource is enhanced by expending the resource only when necessary. However, in current practices in the expenditure of energy for environmental modification of building interiors, systems are designed to perform their environmental modification function irrespective of necessity at a significantly large number of times and places. Taking the heating of a residential building as an example, a typical structure consists of seven or eight rooms and serves as a dwelling place for four or five persons. At any given time, most of the rooms are unoccupied. Nevertheless, a substantial number, if not all, of the unutilized rooms are continuously heated. The typical residential heating system is controlled by a thermostat which controls the furnace to maintain a preselected temperature within the structure. Some improvement of efficiency in prior art systems has been provided by the use of a clock thermostat which maintains the interior of the building at one temperature during a portion of the day and at another temperature during the remainder of the day. This permits some saving of energy by reducing the temperature maintained for a portion of each day. The same effect may be provided by manually resetting the thermostat. With some types of heating systems, noteably central heating systems employing circulating hot water as the heat transfer medium, further efficiencies have been provided in the prior art by the utilization of zone systems in which the structure is divided into two or three zones, each zone having its own thermostat, each thermostat individually controling a valve for regulating the circulation of heating water within its zone, and the furnace being controled by the thermostats disjunctively such that the furnace fires whenever any zone demands heat. In the case of direct electrical heating, each room may be conveniently provided with its own thermostat. This is done in some direct electrical heating installations, but not in the majority, probably because thermostats are relatively expensive devices. Furthermore, to obtain maximum benefit in terms of energy conservation from the use of individual thermostats in each room, the persons occupying the dwelling would be required to manually adjust the thermostats upon entering a previously unoccupied room, and upon leaving a room unoccupied.

Energy conservation in the environmental control systems for structures has also been hampered by a number of misconceptions which have gained a substantial currency of belief. It is now generally accepted that the energy used by a heating system, for example, may be conserved by lowering the temperature setting of the controlling thermostat for a substantial period of time, for example, overnight. Until recently, however, there was a school of thought which held that maximum energy efficiency would be obtained by maintaining a constant environmental condition, resulting in a steady state operation of the macro system comprising the structure and its environmental control apparatus, and that system inertia would defeat any attempt to reduce energy consumption by varying the level at which an environmental parameter is maintained. In fact, the maintenance of a steady state environmental condition is not efficient from the point of view of energy conservation when the utilization of the structure, or portions thereof, is such that the environmental condition need not be maintanined, as, for example, when certain rooms are unoccupied. Nevertheless, the misconception that departure from maintenance of a steady state for short periods of time is inefficient continues to be widely held, and even with the most flexible of presently available control systems, the short term reduction of energy consumption requires that the persons using the structure manually readjust the system control apparatus, such as thermostats, when entering unoccuplied rooms and when leaving rooms unoccupied. Even if the value of doing so is appreciated, it is unlikely that the persons using a structure will make the required adjustments with adequate regularlity. This is expected because of normal forgetfulness of simple tasks, and also because a person who might be planning to reenter a room might feel that his comfort required his not permitting the room to depart from the comfort zone environmental condition.

The dynamics of heat flow in structures is not widely understood. This is the probable cause of the fairly widely held misconception that allowing short term devations from steady state environmental conditions by reducing energy for a short term, after which the structure, or portion thereof, is returned to the comfort zone level of environmental condition will not result in long term energy savings. In fact, the major phenomenom involved in heat flow in structures is conduction through exterior walls. The typical structural wall has an extermely large value of thermal inertia. The energy lost from the interior of a structure to the exterior occurs at the surface of the structural wall. The rate of heat flow at this surface is dependent upon the average value of the temperature differential between the interior and exterior of the structure. Any reduction in interior temperature therefore necessarily reduces the time average value of this differential and accordingly reduces the quantity of heat lost. From this it follows, although it has not generally realized, that very substantial energy savings may be realized by appropriately controlling energy consumption, even over the short period of time, so that energy for environmental modification purpose is consumed only when the environmental modification is needed.

It is, accordingly, an object of this invention to provide a control system for environmental control systems employed in structures which will maximize energy conservation by modifying the parameters of the environment interior to the structures only to the extent necessary.

It is another object of this invention to provide such a control system wherein the operation of the enviornmental control systems is responsive to a composite function of factors consistituting a demand for environmental modification.

It is another object of this invention to provide such a control system which is additionally adaptable to provide sensing and alarm functions with respect to a plurality of emergency conditions.

Yet another object of this invention is to provide such a control system which is inexpensive to manufacture, install, and operate in a structure.

Briefly, and in accordance with one embodiment of this invention, a control system for controlling an environmental parameter modification system comprises a sensor for measuring the value of the environmental parameter to be modified within a volume of the structure, and a sensor within such volume for determining whether the volume is occupied or vacant. A computing device, which may be a very simple logical device, receives a signal from the two sensors and provides an output which controls the environmental modification apparatus to supply modifying energy to the volume only when the signals from the two sensors indicate that the volume is both occupied and the environmental paramenter is at a level outside a preselected range which is desired to be maintained when the volume is occupied. When the volume is unoccupied, the environmental modification system is operated only upon a substantially greater variation in the environmental parameter.

The novel features of this invention sought to be patented are set forth with particularity in the appended claims. The invention, together with further objects and advantages thereof, may be understood from a reading of the following specification and appended claims in view of the accompanying drawings in which:

Figure 4A:
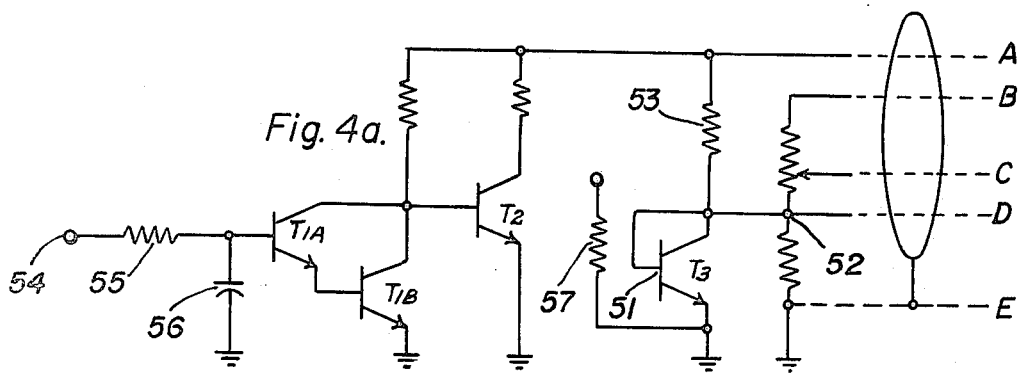
Figure 4B:
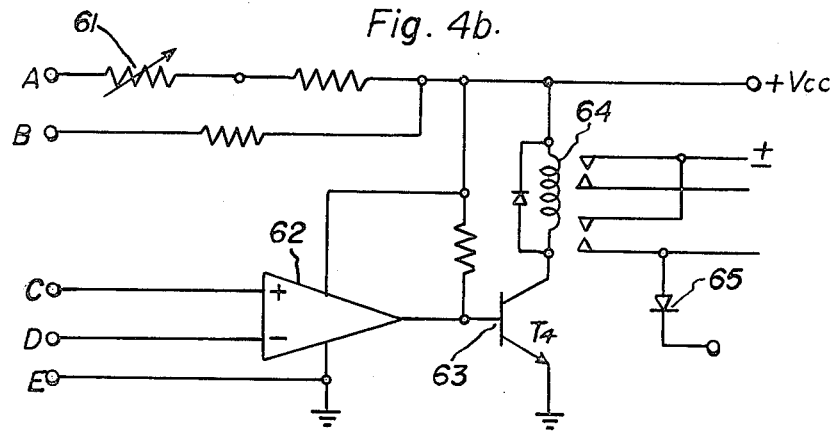

FIG. 4 is an electrical schematic diagram of one embodiment of sensing, logic, and control circuitry useful in practicing this invention. FIG. 4 (a) shows a temperature sensor. FIG. 4 (b) shows logic and control elements.

Figures 5, 5A:
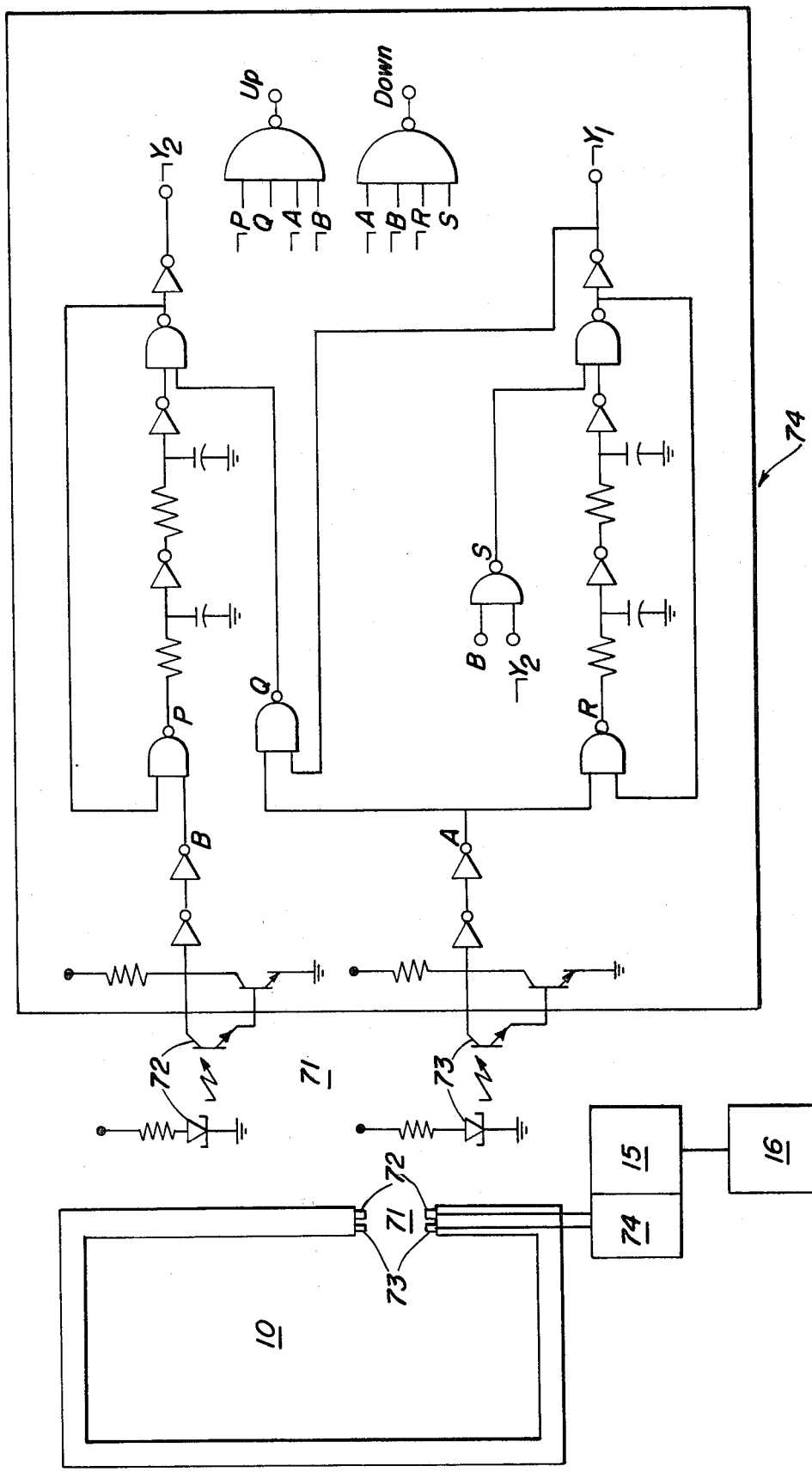

FIG. 5 is a block diagram of one embodiment of occupancy sensor useful in practing this invention.

FIG. 5a is an electrical schematic diagram, with logic block elements included, of the preferred counter circuit for use in the embodiment of FIG. 5.

Figure 6:
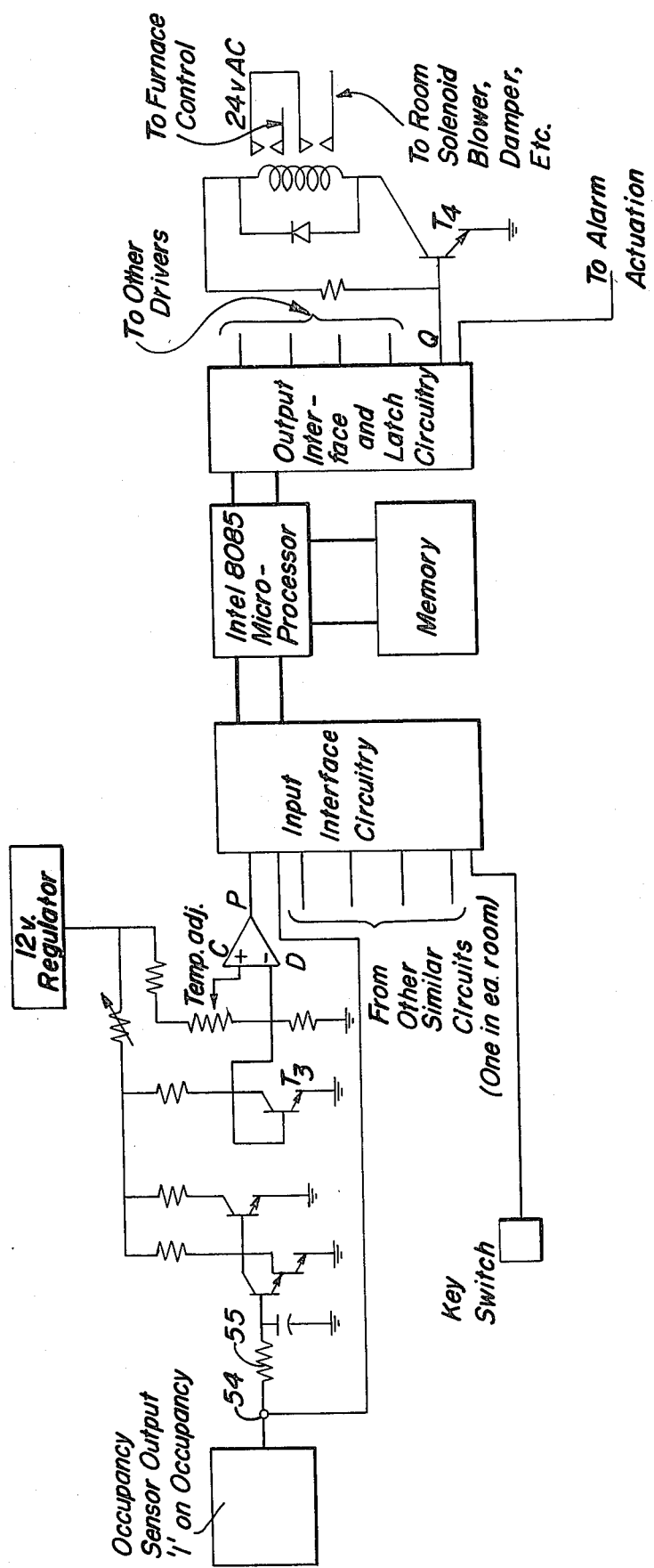

FIG. 6 is an electrical schematic and block diagram of an embodiment of environmental control system apparatus in accordance with this invention in which commercially available microprocessor elements are used in the performance of the control and logic functions of the system.

Figure 2:
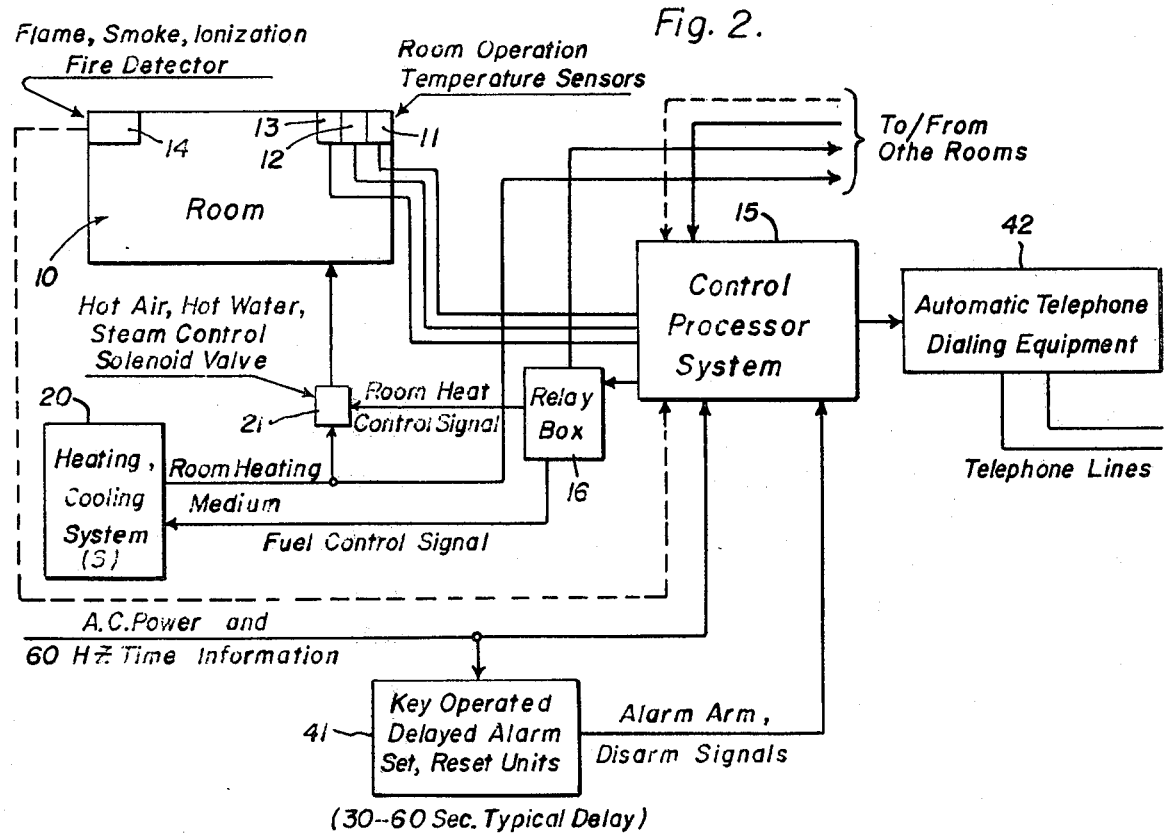
FIG. 2 is a block diagram of a structure environmental control system and apparatus for a structure including a control system in accordance with one embodiment of this invention.
Figure 7:
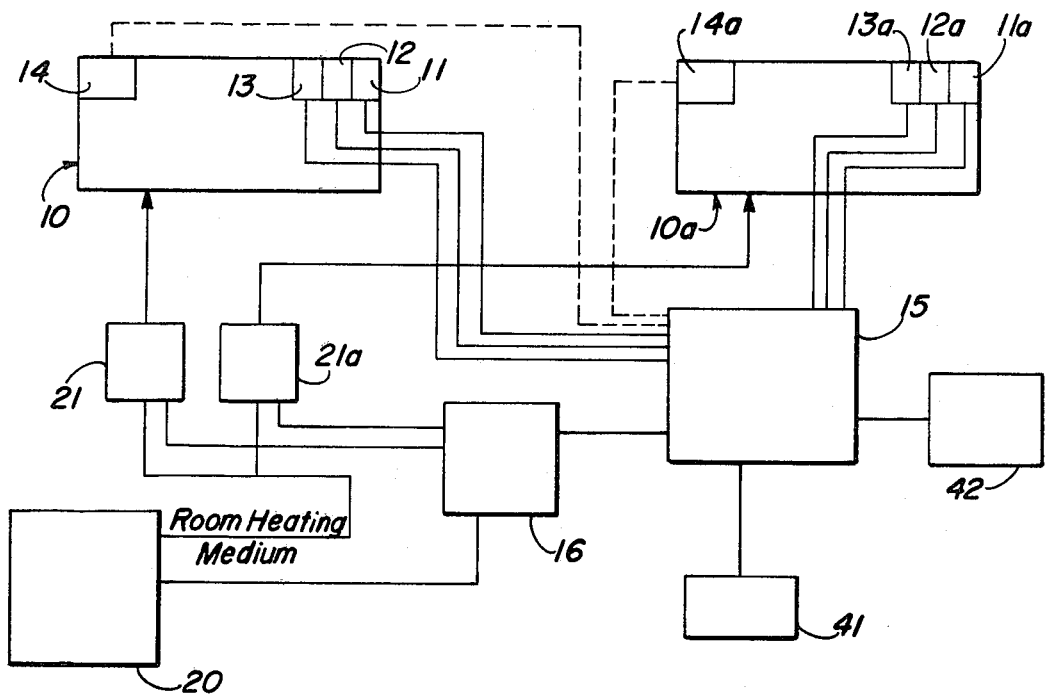

FIG. 7 is a block diagram of a structure environmental control system and apparatus similiar to that of FIG. 2, and wherein like numerals identify identical elements to those shown in FIG. 2, explicitly showing the interconnection between the system block elements and a plurality of rooms.

Figure 1:
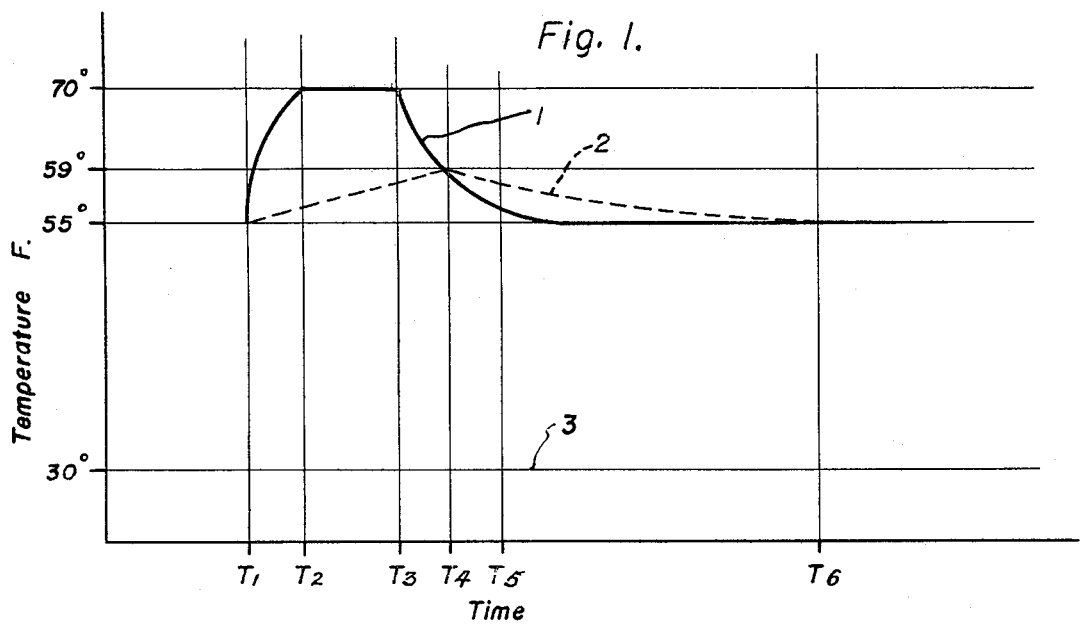
FIG. 1 is a Cartesian graph illustrating the thermodynamic effects across a structure wall of short term variations in the temperature maintained in a volume within the structure.

Taking, for illustrative purposes the example of the heating of a room in a typical residential structure in the winter, FIG. 1 illustrates the temperature variations with time in the room, the wall, and exterior temperature, and serves to illustrate the substantial energy savings which may be achieved by the employment of a system in accordance with this invention. In FIG. 1, the horizontal axis represents time, and the vertical axis represents temperature. Curve 1 represents the variation of room interior temperature with time; this is the parameter which will actually be experienced by occupants of the room. Curve 2 represents the mean temperature of the interior of the structural wall of the room. Curve 3 represents the temperature exterior to the structure, which, for simplicity is assumed to be a constant 30° F. Assuming that the desired interior temperature for an occupied room is 70° F., a system in accordance with this invention will provide that when the room becomes occupied, at time T1 as shown in FIG. 1, and the interior temperature of the room as indicated by a temperature sensor in the room is below, say 68° F., the heating system will be so controlled to provide heat to the room, and the temperature in the room will begin to rise. If it be assumed that the temperature in the room at the time occupancy commences was 57° F., roughly ten to fifteen minutes will elapse between time T1 when the heating demand is initiated, and time T2 at which the interior temperature of the room reaches 70° F. At this point in time, so long as the room remains occupied, the system in accordance with this invention functions operationally analogously to prior art systems to maintain the interior temperature of the room within preselected limits.

Because of the very high thermal inertia of the wall, Curve 2 begins to rise at point T1, but very much more slowly than Curve 1. Also, so long as Curve 1 is either rising or constant, the vertical axis, temperature, value of Curve 2 cannot exceed that of Curve 1. At time T3, as shown in FIG. 1 the room becomes unoccupied again. At time T3, the control system in accordance with this invention senses the unoccupied condition of the room, and the heating apparatus is shut down and the room is allowed to cool down thus conserving energy. The control system in accordance with this invention is so designed, as more particularly set forth hereinafter, to control the heating appararuts to maintain a temperature centered about, say, 70° F. for occupied rooms, and to maintain a substantially lower temperature, say centered about 55° F. in unoccupied rooms. Assuming that the interval between times T2 and T3 is on the order of two hours, and the initial mean interior temperature of the wall at time T3 will be approximately 59° F. At time T3, the room temperature will begin immediately to decline as shown in Curve 1. Curve 2 will continue to rise by a small amount so long as the temperature is reached, or the room is again occupied and the hereinabove described operation is repeated.

At some time, T5 as shown in FIG. 1, approximately two hours after T3, the time at which the room became unoccupied, the interior temperature of the room will have declined to its new equilibrium temperature to be maintained by the control system, if the room has not been reoccupied in the interim. A relatively minor advantage of this invention, but one worth mentioning for its aid in understanding the invention as a whole, is now immediately apparent from Curve 2. Because of the relatively high thermal inertia of the wall, from time T4 until time T6, as shown in FIG. 1, approximately ten hours, the temperature value of Curve 2 exceeds the temperature value of Curve 1. Time T6 represents the time at which the mean interior temperature of the wall will reach the preselected, lower, equilibrium temperature for unoccupied rooms. It may therefore be seen, that when a room controlled by a system in accordance with this invention is unoccupied for a period of many hours, the wall is warmer than the room for a substantial period of time, and the direction of heat flow is accordingly reversed. This is to say, a portion of the energy used to heat the wall is recovered into the room. The major advantage of a system in accordance with this invention, however, is the result of the fact that in terms of energy conservation, the critical factor is the rate of heat loss from a building interior to a building exterior. This is, in turn, a function of the average temperature differential between the interior and exterior of the building. Energy conservation only has meaning over the very long term, and it is therefore appararent that any decrease in the time average temperature differential between the interior and exterior of the building will provide a corresponding decrease in the net average rate of heat flow across the structural wall thus providing a net long term energy saving.

FIG. 2 illustrates in block diagram form a control system in accordance with one embodiment of this invention including multiple functions will be discussed hereinafter. For the moment, the residential room heating control example alone will continue to be described with reference to FIG. 2. Each room in the structure, of which room 10 is typical, is provided with a temperature sensing device 11, and an occupancy sensor 12.

Temperature sensor 11, may be a thermistor, thermocouple, or the base-emitter junction of a transistor, with the transistor embodiment being preferred for reasons of cost and ease of calibration. For a given collector current the base-emitter voltage of a transistor is a linear function of temperature. Therefore, calibration is simply a matter of initial adjustment of the detector for a voltage at some preselected temperature. As another advantage the transistor cost is approximately $\frac{1}{3}$ the cost of a thermistor. Occupancy sensor 12 may be a volumetric detector such as an ultrasonic occupancy detector such as Model D8 or D6 as shown respectively on page 6 and 19 of Mountain West Alarm Supply Co. Catalog A-78 or a microwave doppler occupancy detector such as Model S22 as shown on page 9 of Mountain West Alarm Supply Co. Catalog A-78. Another alternative occupancy detector is a momentary contact button in each room whereby any person entering the room can close the switch to demand heat whereupon an approximately 15 minute room occupied signal is sent to logic element 15 which may be constructed as shown in FIG. 4 and described hereinafter, or may be a commerically available micro processor such as Intel model 8085, as illustrated in FIG. 6 with appropriate peripheral circuitry chips, as are all fully described in "MCS-85 User's Manual" published June, 1977, by Intel Corporation. If the person remains in the room he must retransmit the occupancy signal at 15 minute intervals in order to give a continuous room occupied signal. If he fails to re-transmit the signal the room will begin to cool down. At some point the occupant will be prompted by the cooling of the room to give another room occupied signal. This is the least expensive embodiment of an occupancy sensor, and at a slight cost in occupant comfort also provides maximum energy conservation since the room will begin to cool down after each 15 minute period. When this manual occupany sensor is used in a residential context, a time based override is provided for bedrooms to maintain the desired sleeping temperature therein in the absence of the periodic switch closure room occupied signal. In this connection, the periodic closure of the switch by the room occupant constitutes the sensor room occupied output signal. Another alternative occupancy sensor as shown in FIG. 5 is a perimeter detector operating directionally as for example by having first and second perimeter detectors 71. The logic element 15 of FIG. 2 then includes a counter shown as 74 in FIG. 5 which counts up and counts down. It is well known that logic circuitry may be programmed to count bidirectionally. The room is indicated as vacant when the counter is at zero the preferred circuitry for counter 74 is illustrated in FIG. 5a. It should be noted that one of the advantages of this invention is that it permits the replacement of thermostats by temperature sensing devices which have costs typically on the order of ten percent of that of the thermostats which they replace.

Sensors 11 and 12 provide outputs to logic element 15 which in turn provides control outputs to control element 16 which are a composite function of the signals received from sensing elements 11 and 12. Logic element 15 is programmed to provide control signals to cause heat to be provided to room 10 when the signal from temperature sensor 11 falls below a first preselected limit if, but only if, the signal from occupancy sensor 12 indicates that room 10 is occupied. Otherwise, logic element 15 provides a control signal to cause heat to be supplied to room 10 only if the output of temperature sensor 11 indicates that the temperature of room 10 has fallen below a second, substantially lower, temperature. The use of automatic occupancy sensors 12 providing an output exclusively as a function of room occupancy in each room of the structure relieves the occupants of having to remember to make a manual readjustment of heating demand apparatus, enforces energy conservation by eliminating the possibility that an occupant might choose to leave a room in a condition demanding maintenance of a higher temperature when leaving the room with the belief that he will return shortly, and also allows the system to operate effectively with very inexpensive temperature sensors. Logic element 15 and control element 16 are illustrated as separate elements in the drawing to aid in an understanding of the system operation. Their functions are logically described separately. However, it will be obvious to those skilled in the art, that the separate functions of logic element 15 and control element 16 may, if desired, be performed by a unitary apparatus subsystem comprising, for example, relays.

Control element 16 provides two separate output control signals in the case of a system in accordance with this invention used in a structure having a central heating system. One control signal controls the provision of fuel to the central heating apparatus, such as a furnace. The other output control signal controls the operation of a device associated with each room, such as a solenoid valve 21 inserted in the conduit conveying the heating medium from the furnace to the room. The first output control signal, causes fuel to be provided to the furnace whenever the composite outputs of temperature sensors and occupancy sensors in any room are such as to demand heat to that room. The second output control signal opens the solenoid valve, or equivalent, controlling the delivery of heating medium to each individual room for example room 10 or 10a of FIG. 7 if, but only if, the composite output of the occupation and temperature sensors of that particular room are such that heating is demanded for the individual room involved. Obviously, in a structure in which a central heating system is not employed, for example in a baseboard electrical heating system, the first output control signal from control element 16 is not required, and there are no heating medium conduits to be controlled by solenoid valves. In such cases, control element 16 will provide a single output control signal controlling the provision of "fuel" as for example electrical current to the individual heating means in each room as demanded by the composite outputs of sensors 11 and 12 in accordance with the above-described algorithm.

Figure 3:
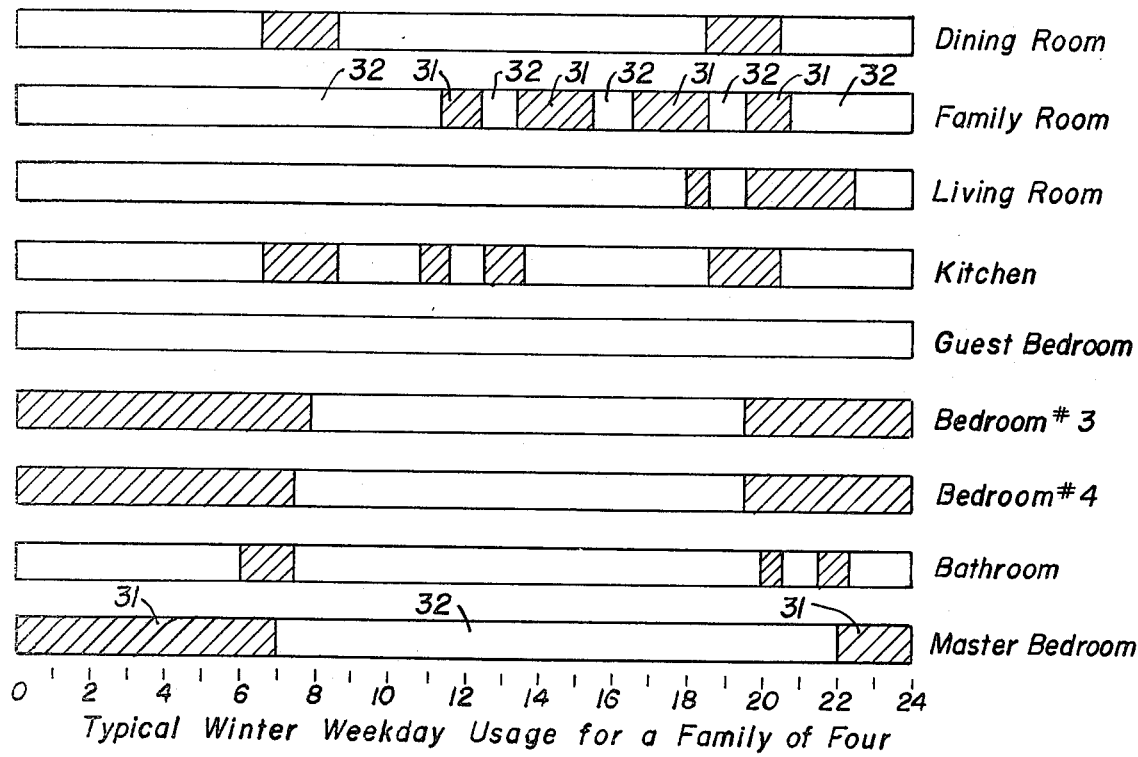
FIG. 3 is a bar chart illustrating room utilization in a typical residential structure.

The fact that substantial energy savings in heating may be achieved by the employment of a control system in accordance with this invention, may be seen from FIG. 3 in which typical usage of various rooms in a typical residential structure are displayed in bar chart form. Taking as particular examples the master bedroom and family room of a typical residential structure, the periods of occupancy are shown by hatched areas 31 on the chart of FIG. 3 and the unoccupied times are shown by the unhatched areas 32. It is immediately apparent that there are very substantial areas 32 of continuously unoccupied condition for each room. It is also apparent that as between the master bedroom and the family room there are no times during the typical day in which heating would be required in both rooms. Thus, in each case, there exists a period during which recovery of wall heat into the interior of the structure as discussed hereinabove with reference to FIG. 1 is possible by the employment of this system. It should also be noted that the unoccupied period 32 of the master bedroom occurs during the portion of the day in which manual setback of thermostats as currently practiced would not be employed, and that the utilization pattern for the family room is such that a large number of relatively brief periods of time in which the room is unoccupied 32 exist that the home owner would be unlikely to conserve energy by intentionally setting back a control.

FIG. 4 illustrates, in electrical schematic form, one embodiment of circuitry useful in accordance with this invention for performing the temperature sensing, logic, and control functions of, respectively, block elements 11, 15, and 16 as shown in FIG. 2. In FIG. 4(a) the temperature sensing element is transistor 51 whose base-emitter voltage varies linearly with temperature. Transistor 51 is connected in series with resistor 53 to form a first voltage divider. A second voltage divider 52 comprises a potentiometer. The voltage across the variable elements of the two voltage dividers are compared in the logic element, 15 of FIG. 2, and more particularly shown in FIG. 4 (b) as discussed hereinafter. The temperature sensing circuit of FIG. 4 (a) receives an input signal at terminal 54 from occupancy sensor 12 of FIG. 2. The signal received from the occupancy sensor biases transistors $T_{1A}$, $T_{1B}$, and $T_2$ either into conduction or cutoff depending upon its state, thereby changing the total resistance in series with calibration resistor 61 of FIG. 4 (b) to vary the thermostatic threshold of the circuit of FIG. 4 (a).

The output signals taken from the first and second voltage dividers of FIG. 4 (a) are transmitted to logic elements 15 as shown in FIG. 2, and more particularly comprising differential amplifier 62 as shown in FIG. 4 (b) by two conductors, C and D, of a four conductor shielded cable. The elements shown in FIG. 4 (a) may, in accordance with the particular embodiment illustrated, conveniently be co-located in each room of the structure; in the particular embodiment of FIG. 4, the elements shown in FIG. 4 (b) may be conveniently co-located centrally in the structure. When the temperature in a room drops below the thermostatic threshold determined by the potentiometer settings and state of input at terminal 54 discussed hereinabove, the output of differential amplifier 62 drives transistor 63 into conduction, which in turn drives relay 64. The contacts of relay 64 control the operation of the environmental parameter modification system, for example a furnace, and distribution controls, for example, solenoid valves, as heretofore described.

FIG. 4 also illustrates two features which may be optionally included in the apparatus of this invention if desired. The first of these is a delay network comprising resistor 55 and capacitor 56 interposed between terminal 54 and the base of transistor $T_{1A}$ so that brief changes in the occupancy of a room, such as when a person merely passes through a room on the way from one part of the structure to another, will not alter the thermostatic threshold of the system. The second optional feature shown is a thermal stabilizer subcircuit to prevent thermostatic overshoot as is known in the art. In this embodiment, the thermal stabilizer includes diode 65 and resistor 57. When relay 64 is activated a small current is passed through resistor 57 which is in close thermal proximity to transistor 51, T3.

The description of the preferred embodiment of this invention to this point has been limited, for the sake of simplicity, to a discussion of a control system in accordance with this invention for controlling residential heating apparatus. The invention, however, is not so limited. A wide variety of environmental conditions within structures may be monitored and controlled by systems in accordance with this invention, and the control system of this invention is further easily adaptable to the performance of other functions of an alarm, control, and reporting nature by the addition of simple and inexpensive modifications to the control system. Returning to FIG. 2, the environmental condition modification apparatus 20, heretofore described as, for example, a furnace in the heating example, may comprise a combined heating and cooling apparatus, such as a heat pump, or may in fact comprise a plurality of independent or quasi-independent sub-systems such as a heating plant, an air conditioning subsystem, a humidifier, etc. Such plural sub-systems may be completely independent or may share any number of components, such as duct work, heat exchangers, etc. In the case of a control system for combined control of heating and cooling apparatus within a structure, the same sensors, 11 and 12 will cause control element 16 to provide an output controlling the supply of energy to the appropriate environmental modification system (heating or cooling) as appropriate, and a signal controlling the distribution of heat transfer medium among the various rooms. If control of a parameter other than temperature, for example humidity, is desired, an additional appropriate sensor 13, for example a transmitting hygrometer as are known in the art, would be provided in each typical room 10. Beyond the provison of a sensor appropriate to each parameter to be controlled, the operation of the system is essentially identical with that heretofore described with respect to heating.

The control system of this invention further lends itself very simply to the performance of emergency alarm and reporting functions. The very simplest emergency alarm and reporting function to add to the environmental control system is intrusion detection because each room in the structure is already provided with an occupancy sensor 12 for control of the environmental parameters as discussed above. Therefore, the only modification needed to the system of this invention as heretofore described to provide for intrusion alarm, is the provision of means 41 whereby the proprietors of the structure may inform logic element 15 that the structure is being intentionally left unoccupied for a period of time. Means 41 may be any simple double throw electrical switch but is preferrably a key switch for security purposes. Such switch means are well known in present burglar alarms and perform their well known function as an element of this embodiment of this invention. The advantage herein provided is that intrusion detection is performed without additional detectors over those used for environmental control. When key switch 41 is set in the building occupied position, the system functions as heretofore described for environmental control purposes. When the switch means 41 which may, for example, advantageously be one of the M15 series of key switches as shown on page 45 of the Mountain West Alarm Supply Company Catalog A-78 is set to the building unoccupied position, logic element 15 provides outputs to control the environmental modification apparatus as heretofore described in the room unoccupied mode and, upon receiving an occupancy indicative output from an occupancy sensor 12 in any room, instead of modifying the environmental parameters, as heretofore, provides an output to alarm effector 42. Alarm effector 42 may be any effector such as known in art, for example, a loud bell, or an automatic telephone dialing device which may, for example, be a telephone dialer as illustrated on page A-1 of Mountain West Alarm Supply Company Catalog A-78 to notify providers of emergency service, or any combination of known alarm effectors.

Similarly, by the provision of additional sensors 14 in each typical room 10 any other emergency or hazard condition desired to be detected may be detected an a corresponding output to logic element 15 for activation of alarm mechanism 42 for example, sensor 14 may be a smoke or ionization detector for fire hazard warning purposes. The operation of logic element 15 upon receipt of a hazard condition signal from detector 14 may be dependent or independent of the setting of switch means 41, as desired. For example, in the case of a fire alarm, it may be desired to have logic element 15 cause a bell to ring to alert the occupants of the structure immediately upon detection of a hazard condition when switch means 41 is set to the structure occupied position, and alternatively, to activate an automatic telephone dialing device to call the fire department upon the existence of a fire hazard signal when switch member 41 is set to the structure unoccupied position.

Other alternative features may be incorporated into the system of this invention, if desired. The flexibility of the system is one of its major advantages and a wide range of modifications will occur to those skilled in the art. A a first example of such modifications, a very simple fire alarm may be incorporated into the system by merely programming logic element 15 to respond to first and second temperature thresholds for environmental control purposes as discussed above and to respond to a third temperature threshold at approximately 135° F. as a fire alarm. Thus by simply programming the logic, the temperature sensor 11, already provided for environmental control sensing may be made to provide a fire hazard sensing function very economically.

As a second example of such modifications, a residential structure may be provided at conveniently located positions with a plurality of manually operable switches connected in parallel with the occupancy sensors in the various rooms. Activation of such switches would transmit a momentary room occupied equivalent signal for the room corresponding to the switch activated thus allowing a person to cause a room to begin its environmental parameter modification prior to being entered.

The foregoing descriptions have basically used a residential structure as the context in which to describe the operation of a system in accordance with this invention. The applicability of this invention is by no means so limited. As to the alarm functions described immediately herein above, the applicablity to industrial and commercial structures is considered obvious. With respect to the environmental modification functions, the applicability to commercial buildings is of even greater significance than to residential structures. Typical commercial structures are laid out with the space or each floor divided essentially into 3 concentric rings. In the innermost ring are placed elevator and utility shafts, conference rooms, service functions such as rest rooms, libraries, file rooms, cafeterias, and the like. This core is almost invariably not provided with heating or cooling registers, but is allowed to equilibrate through ventilation with the outer rings. The core is very substantially insulated by the outer rings. The middle ring is occupied by work stations for support personnel performing clerical and administrative functions. The middle ring is frequently not fully partitioned, is typically continuously occupied during the working day, and may or may not be provided with heating and cooling registers. The outer ring is typically divided into a large number of relatively small, fully partitioned rooms. These rooms are not continuously occupied during the working day, have a substantial proportion of glazing, and have a substantial proportion of the total heating and cooling registers of the building installed therein. In view of the typical construction and utilization of commercial buildings as described immediately hereinabove, it should be clear to those skilled in the art that the utilization of a control system in accordance with this invention in the rooms of the outer ring will result in very substantial energy savings, typically in excess of that which will be obtained in residential use.

While this invention has been described with reference to particular embodiments and examples, other modifications and variations will occur to those skilled in the art, in view of the above teachings. Accordingly, it should be understood that within the scope of the appended claims, the invention may be practiced otherwise that is specifically described.

The invention claimed is:

1. An environmental control system for a structure having a plurality of rooms and means for modifying an environmental parameter within said structure comprising:

an occupancy sensor in each room of at least two rooms of said plurality of rooms providing exclusively a first output signal when said room is occupied and a second output signal when said room is unoccupied;

a second sensor in each room of at least two rooms of said plurality of rooms for providing an output signal responsive to the level of said environmental parameter in said room;

control means for receiving the output signals of each and every of said occupancy sensors and said second sensors and for controlling said means for modifying responsively to a composite function of said output signals of said occupancy sensors and said sensors; and wherein said control means more particularly includes means for receiving the output signals of said occupancy sensors and said second sensors and for providing a control output signal, said control output signal being a composite function of said output signals of said occupancy sensor and said second sensor; and means for receiving said control output signal and controlling said means for modifying responsively to said control output signal; and wherein further said environmental parameter is temperature, and said means for modifying comprises an energy conversion unit and means for conveying a fluid from said energy conversion unit to said rooms.

2. An environmental control system as claimed in claim 1 wherein said structure has means for modifying a plurality of environmental parameters and further including:

at least one additonal sensor for providing an output signal responsive to the level of one of said environmental parameters;

said control means receiving additionally the output of said at least one additional sensor and controlling said means for modifying to modify one environmental parameter responsively to a composite function of said output signals of said occupancy sensor and said second sensor, and controlling said means for modifying to modify another environmental parameter responsively to a composite function of said output signals of said occupancy sensor and said at least one additional sensor.

3. The control system of claim 1 wherein said second sensor is a temperature sensor comprising the base-emitter junction of a transistor.

4. The control system of claim 3 including additonally thermal stabilizer means comprising a resistance heating element adjacent said transistor.

5. The control system of claim 1 wherein said means for receiving said control output signal and controlling said means for modifying comprises:

means for starting and stopping operation of said energy conversion unit; and valve means interposed in said means for conveying for controlling distribution of said fluid among said rooms.

6. The control system of claim 1 wherein said composite function is such that said control means controls said means for modifying to maintain each of said rooms at a first level of said environmental parameter when said room is occupied and at a second level of said environmental parameter when said room is unoccupied and including means for setting said first and second levels.

7. An environmental control system as claimed in claim 1 wherein said control means includes additionally means for actuating an emergency condition response device.

8. The control system of claim 7 wherein said environmental parameter is temperature, and wherein said means for actuating actuates said emergency condition response device when said output signal of said second sensor corresponds to a temperature in said room in excess of 135° Farenheit.

9. The control system of claim 7 including additionally:

a third sensor for providing an output signal responsive to the presence of an emergency condition in at least one of said rooms, said control means receiving additionally said output signal of said third sensor; and an emergency conditon response device.

10. The control system of claim 9 wherein said emergency condition response device includes a telephone dialing device.

11. The control system of claim 7 including additionally means for providing a signal to said control means to indicate that said structure is intended to be unoccupied, said emergency condition responsive device including an intrusion alarm actuated by said control means whenever said occupancy sensor provides said first output signal contemporaneously with an indication from said means for providing that said structure is intended to be unoccupied.

12. The control system of claim 11 wherein said means for providing a signal includes a key operated electrical switch.

13. The control system of claim 11 including additionally:

a third sensor for providing an output signal responsive to the presence of an emergency condition other than intrusion in at least one of said rooms, said control means receiving additionally said output signal of said third sensor;

means within said control means for causing said emergency condition responsive device to provide a first response upon contemporaneous receipt of said first output signal of said occupancy sensor and said indication from said means for providing that said structure is intended to be unoccupied and a second response upon receipt of said output signal of said third sensor.

14. A control system as claimed in claim 1 wherein said occupancy sensor comprises:

means for establishing an energy distribution pattern in said room; and means for detecting an abberation in said energy distribution pattern.

15. The control system of claim 14 further including time delay means interposed between said means for detecting and said control means whereby said control means is prevented from receiving said first output signal until said room has been occupied continuously for a preselected period of time.

16. A control system as claimed in claim 1 wherein said room has an entryway and said occupancy sensor comprises:

first and second perimeter detectors disposed across said entryway, each said perimeter detector providing an output pulse when an object crosses said entryway, said first and second perimeter detectors being disposed in spaced relation to each other such that the output pulse provided by said first perimeter detector preceeds the output pulse provided by said second perimeter detector when an object enters said room and the output pulse provided by said second perimeter detector preceeds the output pulse provided by said first perimeter detector when an object leaves said room; and bi-directional counter means receiving said output pulse provided by said first and second perimeter detectors, said bidirectional counter means counting upwardly by one for each reception of an output pulse provided by said first perimeter detector followed by an output pulse provided by said second perimeter detector and counting downwardly by one for each reception of an output pulse provided by said second perimeter detector followed by an output pulse provided by said first perimeter detector, said bi-directional counter means providing said second output signal when its net count is zero and said first output signal when its net count is positive.

17. The control system of claim 16 including additionally:

an accumulator receving an output of said bi-directional counter means; and a display device for receiving an output of said accumulator and indicating the number of occupants of said room.

18. The control system of claim 16 further including time delay means interposed between said bi-directional counter means and said control means whereby said control means is prevented from receiving said first output signal until said room has been occupied continuously for a preselected period of time.

* * * * *